(12) United States Patent
Braden et al.

(10) Patent No.: US 8,208,777 B2
(45) Date of Patent: Jun. 26, 2012

(54) STRUCTURE FOR ELECTRICAL AND/OR OPTICAL CABLE USING IMPREGNATED FIBER STRENGTH LAYER

(75) Inventors: Jason Braden, Pearland, TX (US); Brian Clark, Sugar Land, TX (US); Dean Homan, Sugar Land, TX (US)

(73) Assignee: Intelliserv, LLC, Houston, TX (US)

( * ) Notice: Subject to any disclaimer, the term of this patent is extended or adjusted under 35 U.S.C. 154(b) by 580 days.

(21) Appl. No.: 12/392,019

(22) Filed: Feb. 24, 2009

(65) Prior Publication Data

US 2010/0215327 A1  Aug. 26, 2010

(51) Int. Cl.
*G02B 6/10* (2006.01)
*G02B 6/00* (2006.01)
*G08C 17/00* (2006.01)
*G08C 19/12* (2006.01)
*H01B 7/00* (2006.01)

(52) U.S. Cl. ........ 385/131; 385/100; 385/101; 385/129; 385/130; 385/132; 385/134; 385/138; 340/854.7; 340/870.28; 166/242.1; 166/242.6; 174/120 R; 174/121 R; 174/121 SR; 174/122 R; 174/122 G

(58) Field of Classification Search ............. 385/101, 385/131, 138; 340/870.28; 166/242.6; 174/120 R, 174/121 R, 121 SR, 122 R, 122 G
See application file for complete search history.

(56) References Cited

U.S. PATENT DOCUMENTS

| | | | | |
|---|---|---|---|---|
| 3,391,246 | A | * | 7/1968 | Freeman et al. ......... 174/117 FF |
| 4,662,437 | A | * | 5/1987 | Renfro .................... 166/65.1 |
| 2001/0031349 | A1 | * | 10/2001 | Ellison et al. ............ 428/292.1 |
| 2004/0217880 | A1 | * | 11/2004 | Clark et al. ............. 340/854.9 |
| 2005/0056421 | A1 | * | 3/2005 | Homan et al. ............ 166/254.2 |
| 2006/0225926 | A1 | | 10/2006 | Madhavan et al. |
| 2007/0159351 | A1 | * | 7/2007 | Madhavan et al. ......... 340/855.1 |
| 2009/0038849 | A1 | * | 2/2009 | Braden et al. .............. 175/40 |
| 2009/0084541 | A1 | * | 4/2009 | Braden ................... 166/242.6 |
| 2009/0166087 | A1 | * | 7/2009 | Braden et al. .............. 175/40 |

FOREIGN PATENT DOCUMENTS

JP  58033206 A  *  2/1983

* cited by examiner

*Primary Examiner* — Ryan Lepisto
(74) *Attorney, Agent, or Firm* — Conley Rose, P.C.

(57) ABSTRACT

A cable includes at least one plastic impregnated fiber layer and at least one conductor in contact with the at least one fiber layer. In some examples, the fiber may be glass fiber, aramid fiber or carbon fiber. In some examples, the plastic may be thermoset plastic, thermoplastic or chemically set resin. In some examples, the conductor may be an electrical conductor or an optical fiber.

24 Claims, 8 Drawing Sheets

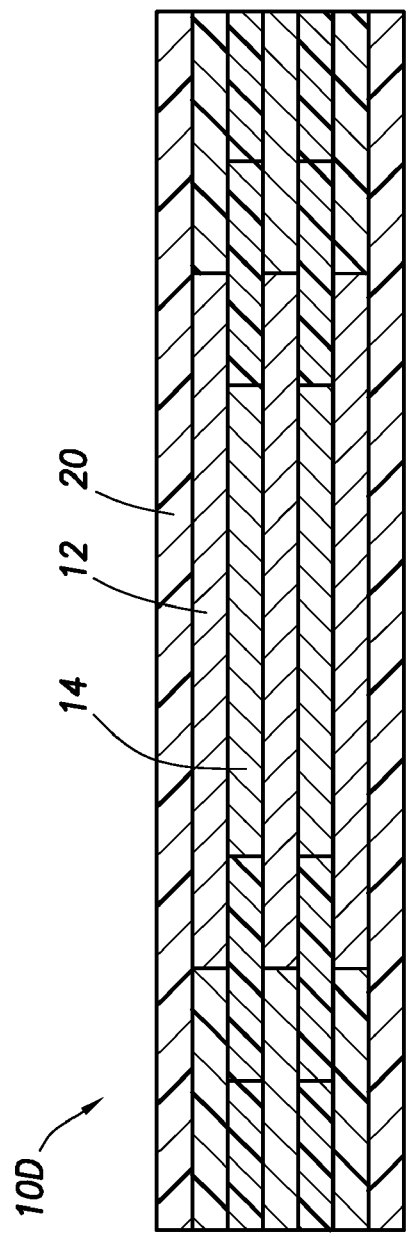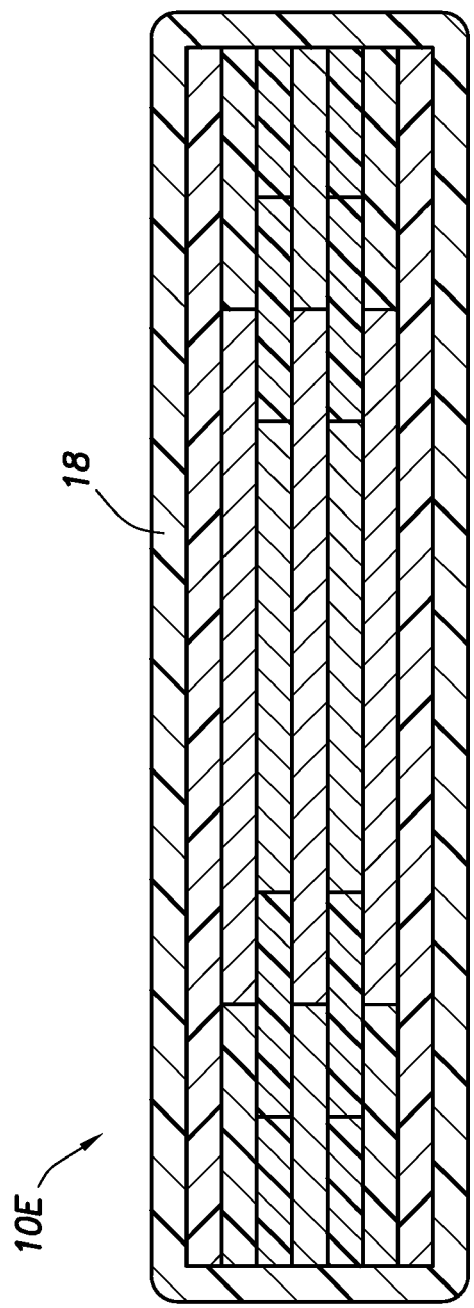

STRUCTURE FOR ELECTRICAL AND/OR OPTICAL CABLE USING IMPREGNATED FIBER STRENGTH LAYER

BACKGROUND OF THE INVENTION

1. Field of the Invention

The invention relates generally to the field of electrical and optical cables. More specifically, the invention relates to such cables made with impregnated fiber strength layers.

2. Background Art

Electrical and optical cables known in the art include one or more conductors, typically covered by a layer of insulating material such as plastic. An electrical cable may include a conductor that electrically conductive, and an optical cable may include a optical fiber that conducts an optical signal. In an optical cable, one or more optical fibers may be enclosed in a plastic or metal tube for protection. The foregoing structures may be enclosed in or associated with a strength member for providing the cable with the capacity to withstand axial tension. The strength member may be internal to the cable and include various forms of braided or wound material such as steel wire, natural fiber or man-made fiber, wherein the cable is covered on its exterior by a jacket such as may be made from plastic. The strength member may also be external to the cable, such as a plurality of coaxial, contrahelically wound layers of steel wire surrounding the foregoing electrical conductors and/or optical fibers. Such external armor may provide the cable with substantial axial load carrying capacity and protect the foregoing structures from damaged caused by abrasion. The most common configuration for the foregoing types of cables is round, wherein the cable has a substantially circular cross-section. The foregoing round cables have been used successfully in harsh environments, including placement in subsurface wellbores having high fluid pressure, chemically active fluid, and high temperature.

Other types of cables may be flat, having a substantially rectangular cross-section and including a plurality of electrical conductors and/or optical fibers arranged side by side and enclosed in a plastic jacket or deposited on a plastic substrate. Such cables are commonly known as "ribbon cables" and may be used for purposes such as making electrical connection from control circuits to a printer head in a computer printer. Other uses for such ribbon cables include open waveguides, such as widely familiar 300 ohm impedance analog television signal transmission cable. See, for example, U.S. Pat. No. 6,015,607 issued to Fraivillig.

For all of the foregoing types of cable, the plastic used for insulation and fluid exclusion is typically a flexible plastic material that may be extruded or similarly formed into suitable shapes. Such plastic material includes, for example, polyethylene, neoprene, nitrile rubber, and a material sold under the trademark TEFLON, which is a registered trademark of E.I. DuPont de Nemours & Co. Wilmington, Del.

Plastic impregnated fiber perform is used to make articles such as fluid carrying tubes and liners for metal fluid carrying tubes. See, for example, U.S. Pat. No. 7,114,751 issued to Reynolds. Plastic impregnated fiber perform may include a fiber, such as glass fiber, graphite fiber, or synthetic polymer fiber such as aramid fiber, formed into a selected pattern, such as a braided sleeve or sheet. The fiber formed in the selected pattern is then impregnated with plastic material, such as thermoplastic or chemically cured resin such as epoxy resin. The plastic or resin upon cure causes the fiber perform to make a structure that is resistant to chemical attack, can withstand fluid under pressure, and typically has substantial mechanical strength, such as to resist fluid intrusion and carry axial loading.

There continues to be a need for electrical and optical cables that can withstand harsh environmental conditions and can have substantial mechanical strength.

SUMMARY OF THE INVENTION

A cable according to one aspect of the invention includes at least one plastic impregnated fiber layer and at least one conductor in contact with the at least one fiber layer. In some examples, the fiber may be glass fiber, aramid fiber or carbon fiber. In some examples, the plastic may be thermoset plastic, thermoplastic or chemically set resin. In some examples the conductor may be an electrical conductor or an optical fiber.

A wired pipe segment according to another aspect of the invention includes a segment of pipe having a threaded connector at each longitudinal end. The pipe includes a cable extending between grooved formed in a thread shoulder in each threaded connector and a communication device disposed in each groove and in signal communication with a conductor in the cable. The cable includes at least one plastic impregnated fiber layer and the least one conductor in contact with the at least one fiber layer.

Other aspects and advantages of the invention will be apparent from the following description and the appended claims.

BRIEF DESCRIPTION OF THE DRAWINGS

FIGS. 2 through 11 show other example flat cable structures.

DETAILED DESCRIPTION

Figure 1:
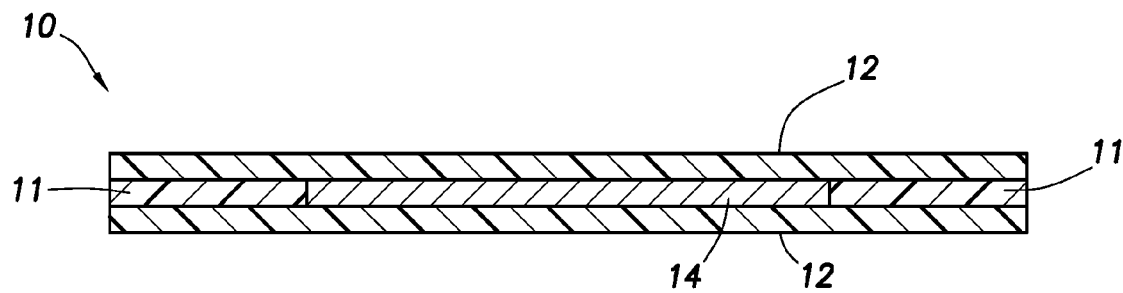
FIG. 1 shows an example flat cable structure using impregnated fiber laminations.

An example of a structure for a cable is shown in FIG. 1. The cable 10 may include one or more substantially flat, elongated layers, referred to herein as laminations 12 made from plastic impregnated fiber. The fiber may be, for example, glass fiber, carbon or graphite fiber, synthetic polymer fiber, such as aramid fiber, or any combination thereof. The type of fiber used will be related to predetermined mechanical properties electrical properties of the completed cable. In some examples the fiber will be woven into a braid or similar structure to provide strength to the cable 10. Graphite fiber is typically more electrically conductive than glass or polymer fiber, while being considerably stronger. Therefore, the use of carbon fiber or graphite fiber instead of less conductive fiber materials will affect electrical properties of a cable made using carbon or graphite fiber.

The fiber used in the laminations 12 may be impregnated with plastic, such as thermoset plastic, thermoplastic, chemically cured plastic such as epoxy resin or other plastic known to those of ordinary skill in the art. The laminations 12 may be used to form the cable 10. In an embodiment, the laminations 12 may form the cable 10 prior to setting or curing of the impregnating plastic. Alternatively, the plastic may be of a composition that enables curing thereof before making the cable from one or more laminations, and later bonding one lamination to one or more additional laminations or other materials in the cable 10. Such plastic may be, for example, thermoplastic that can be fused by heating above its melting point. Alternatively, some types of plastic that may be used to impregnate the fiber to form a lamination, such as polyvinyl chloride, for example, may be bonded to similar composition laminations using solvent welding.

The cable 10 includes at least one conductor, which in the present example is an electrical conductor layer 14. As will be further explained below, in other examples the conductor may be an optical fiber. As used herein the term "conductor" is intended to mean any device that can carry power and or signals along the cable 10, such as an electrical conductor, and optical conductor, or other examples known in the art. Thus, although examples are described with certain conductors, it will be understood that other types of conductors may be used in its place. The electrical conductor layer 14 may be substantially flat, and may be disposed between laminations 12 in the thickness direction thereof. For example, the electrical conductor layer 14 may be disposed between two layers of the laminations 12. The electrical conductor layer 14 may be made from any electrically conductive material such as metal foil (e.g. copper or aluminum foil), or may be metal braid, such as copper wire braid, for example. The conductor layer 14 may also be, for example, metal particles suspended in a bonding agent such as plastic or epoxy resin and having sufficient interparticle contact to provide the layer 14 with substantial electrical conductivity. The laminations 12 and the electrical conductor layer 14 may have a thickness as small as a fraction of a millimeter, for example, 0.05 mm to 0.5 mm.

The example cable shown in FIG. 1, and other examples described below with reference to FIGS. 2 through 11 use a plurality of the laminations 12 bonded along the thickness direction to enclose the conductor (e.g., layer 14). Other example structures for a cable according to the various aspects of the invention may use a single lamination rolled or otherwise formed to enclose the conductor. Such examples will be explained further below with reference to FIGS. 12 through 18. For purposes of defining the scope of the invention, it is only necessary to have one such lamination made from plastic impregnated fiber.

To make the example cable 10 shown in FIG. 1, a first one of the laminations 12 may be disposed such as on a roller or a flat surface to enable placement of the electrical conductor layer 14 thereon. Such placement of the electrical conductor layer 14 may be followed by placement thereon of a second lamination 12 to enclose the electrical conductor layer 14. The laminations 12 may have a greater width than the electrical conductor layer 14 and may be applied onto and laterally adjacent to the conductive layer 14. Alternatively, and as shown in FIG. 1, the cable 10 may include lamination spacers 11 disposed laterally adjacent to the electrical conductor layer 14. The spacers 11 may be formed from the same or a different electrically nonconductive material as the laminations 12. The spacers 11 may be used to provide the cable 10 with a substantially flat, rectangular cross section as shown in FIG. 1.

The combined assembly of the laminations 12, the spacers 11 (if used), and the electrically conductive layer 14 may be subjected to one or more processes to cure the plastic that impregnates the laminations 12. For example, the cable 10 may be subject to compression in a plane normal to the thickness direction of the laminations 12 and heated to cure thermoplastic. Some types of thermoplastic may be cured by cooling, or by exposure to radiation such as ultraviolet radiation or an electron beam. Other types of plastic, such as epoxy resin, may be cured by introduction of a chemical reagent, as is known in the art. After cure or set of the plastic, the cable 10 may assume the cross section substantially as shown in FIG. 1.

Figure 2:
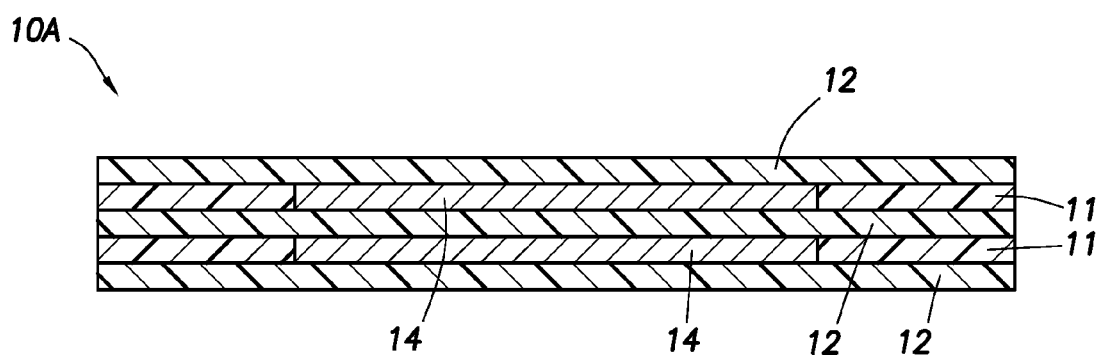

Another example of a cable according to the invention is shown at 10A in FIG. 2. The cable 10A shown in FIG. 2 is made to a substantially similar structure as the cable shown in FIG. 1, and includes two electrically conductive layers 14 spaced apart in the thickness direction by the lamination 12. The laminations 12 and the conductive layers 14 may be formed from materials as described above with reference to FIG. 1. The cable 10A structure may further include lateral spacers 11, just as in the example shown in FIG. 1 to maintain a rectangular cross-section, or the cable 10A may be made without such spacers 11 in some examples.

Figure 3:
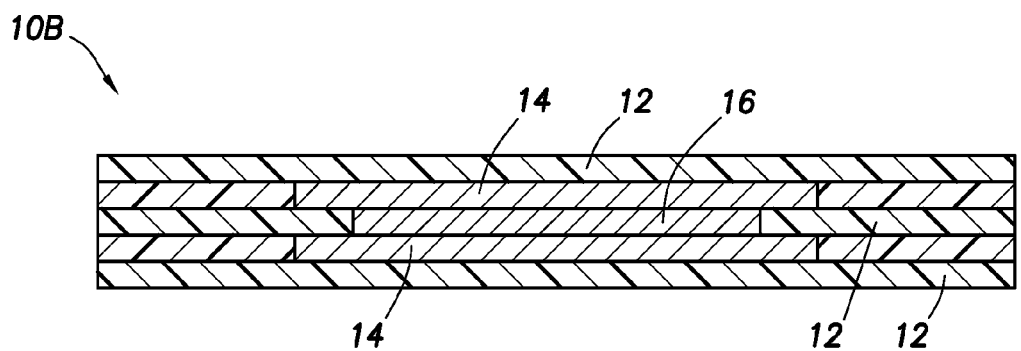

Another example cable structure shown at 10B in FIG. 3 may have a basic structure substantially the same as the example cable shown in FIG. 2, but the example shown in FIG. 3 can include a dielectric layer 16 disposed between the two electrically conductive layers 14. The dielectric layer 16 may or may not include fiber therein, and may be formed from a material having a selected dielectric constant so that the cable 10B will have a selected overall electrical impedance. As will be explained with reference to FIG. 19, the electrical impedance is related to the spacing between the conductor layers 14, the dielectric properties of the dielectric layer 16 and the lateral dimension (width) of the conductor layers 14.

Figure 4:
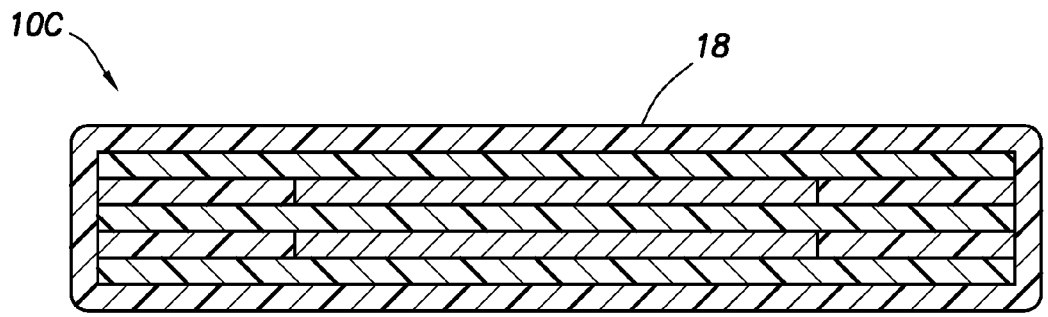

The basic cable structures shown in FIGS. 1, 2 and 3 may be subject to fluid invasion or "wicking" of fluid by capillary pressure along the fibers in each of the laminations 12. Such wicking may occur if the cable were immersed in fluid. Such immersion may be expected with certain uses of the cable, for example, providing an electrical power and/or signal communication channel for "wired" drill pipe. See, for example, U.S. Patent Application Publication No. No. 2006/0225926 filed by Madhavan, et al., the underlying patent application for which is assigned to the assignee of the present invention for a description of one form of wired drill pipe. To reduce fluid invasion, the cable may be covered on its exterior by a substantially impermeable jacket. One example of such jacket is shown in FIG. 4 at 18 disposed on any of the example cable structures, e.g. 10C in FIG. 4, as described above with reference to FIGS. 1 through 3. The jacket 18 may be formed from plastic such as thermoplastic or polyurethane, or may be made from metal. Any of the foregoing structures shown in FIGS. 1 through 3 may include a jacket 18 such as shown in FIG. 4 on the exterior thereof to resist such fluid invasion, and accordingly, the interior cable structure shown in FIG. 4 is not intended to limit a cable structure according to the various aspects of the invention.

Another structure for a cable is shown in FIG. 5. The cable 10D may include laminations 20 made from a different type of fiber, for example, carbon or graphite fiber where the laminations 12 are made from glass fiber. Such laminations 20 are also plastic impregnated and may have higher strength, and may provide the cable 10D with some degree of electrostatic shielding, because graphite fiber is more electrically conductive than glass fiber or synthetic polymer fiber. Carbon fiber is also typically stronger than glass fiber, and may provide the overall cable structure shown in FIG. 5 with more mechanical strength than the previous examples using only glass fiber or synthetic polymer fiber.

The cable structure shown in FIG. 5 is shown in FIG. 6 at 10E including an impermeable jacket 18, similar to the example shown in FIG. 4.

The cable structures shown in FIGS. 2 through 6 include two or more electrically conductive layers 14 disposed along the thickness direction of the cable. It is within the scope of the present invention to include electrically conductive layers in a structure similar to that shown in FIG. 1, wherein a plurality of electrically conductive layers are disposed side by side in a single layer. An example of such structure is shown at 10F in FIG. 7. The example shown in FIG. 7 includes two electrically conductive layers 14 disposed side by side between the laminations 12. The space between the laminations 12 not occupied by the electrically conductive layers 14 may be filled with the spacers 11 as in the previous examples. Although not shown in FIG. 7, the cable 10F may also be covered by an impermeable jacket. See 18 in FIG. 6, for example.

Figure 7:
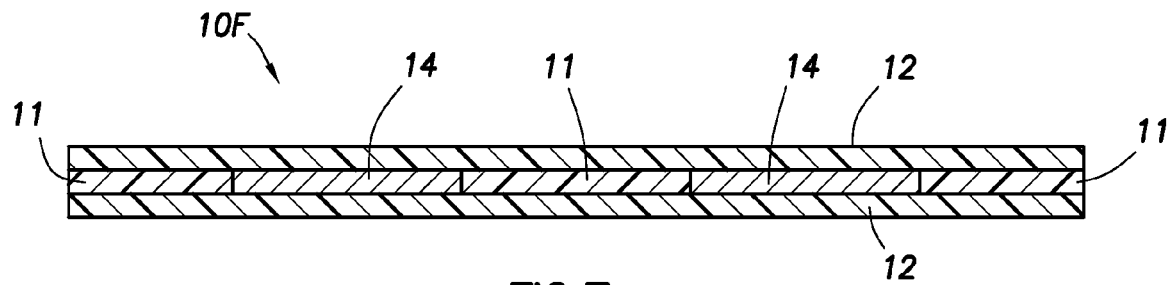
Figure 8:
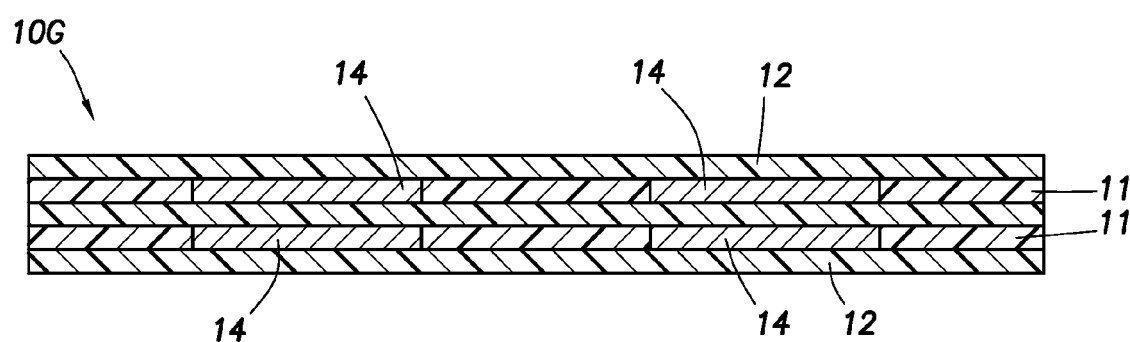

The structure shown in FIG. 7 may be replicated in multiple layers, such as shown in FIG. 8. The cable 10G shown in FIG. 8 includes two such electrically conductive layers 14 in each of two lamination layers. As in the previous examples, the space not occupied in each lamination layer not occupied by electrically conductive layer 14 may be occupied by a spacer 11.

Figure 9:
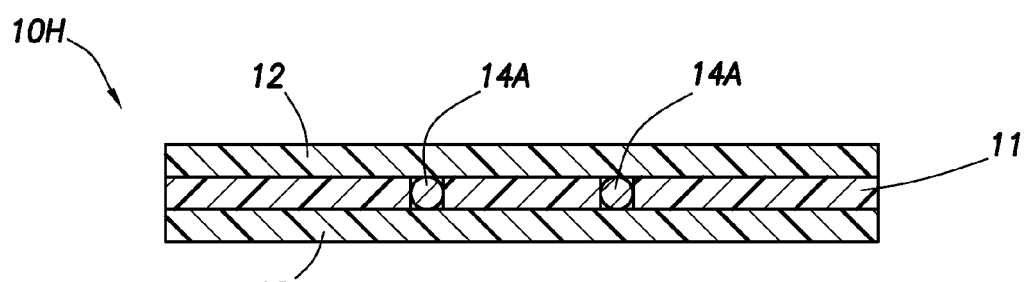
Figure 9A:
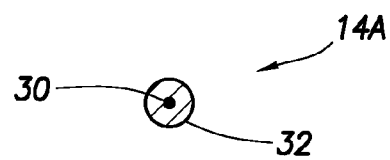

The foregoing examples are directed to substantially flat electrically conductive layers but may be applied for other shaped wires as will be appreciated by those having ordinary skill in the art. An example that uses round electrical conductors may be observed in FIG. 9. The cable 10H is shown including laminations 12 as in the previous examples, and two, substantially round electrical conductors 14A. The conductors 14A may be separated by spacers 11 as in the previous examples. The structure shown in FIG. 9 is not limited to using electrical conductors. For example, the structure shown in FIG. 9 may include additionally or in substitution of one or more electrical conductors, an optical fiber, typically enclosed in a tube. FIG. 9A shows an example, at 14A, of an optical fiber 30 enclosed in a tube 32 such as a steel tube or plastic tube. A cable made according to FIG. 9 may thus include one or more fibers enclosed in one or more tubes as shown in FIG. 9A disposed between laminations (12 in FIG. 9).

Figure 10:
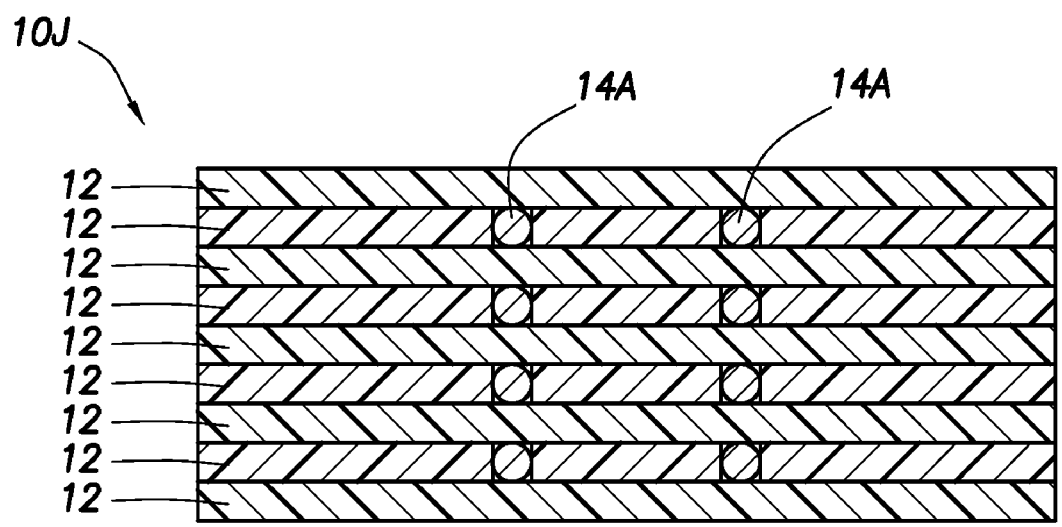

The basic structural configuration shown in FIG. 9, and FIG. 9A, may be replicated in a plurality of interspersed laminations 12 and electrical and/or optical conductor layers, as shown in FIG. 10 at 10J. Such replication may be in the thickness direction as shown in FIG. 10, or may be in the lateral direction, depending on thickness limitations and lateral space limitations for the cable as it is intended to be used.

Figure 11:
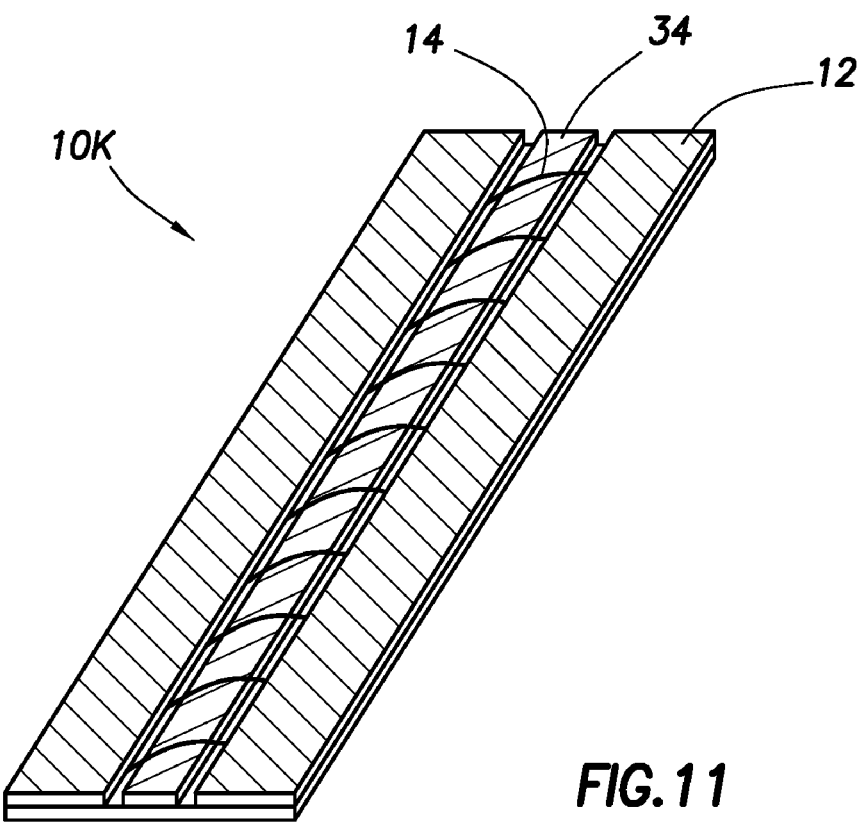

Another example of an electrical conductor "core" for a structure such as shown in FIG. 1 is shown in FIG. 11. The cable 10K may include laminations 12 as shown in FIG. 1, however the electrical conductor (shown at 14 in FIG. 1) may be substituted by one or more insulated electrical conductors 14 wound around a core 34. The core 34 may be a dielectric layer, or may be a magnetically permeable material such as ferrite, depending on the electromagnetic and electrical impedance properties that are desired for the cable 10K.

Figure 12:
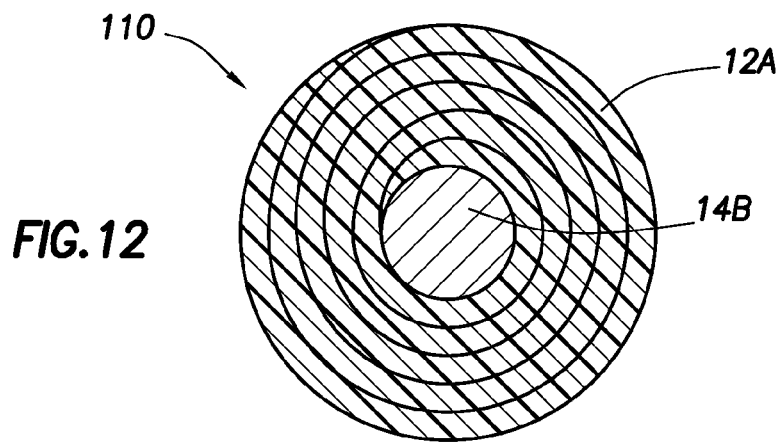
FIGS. 12 through 17 show examples of round cable structures made using impregnated fiber layers.

The examples shown in FIGS. 1 through 11 are generally "flat" cables, wherein the cable structure is formed by bonding together laminations made from impregnated fiber and electrical conductors and/or optical fibers of one or more configurations. The lamination structure shown in the forgoing examples may also be used to form round cables of various configurations. Referring to FIG. 12 a cable 110 may be formed by rolling a lamination 12A (formed from impregnated fiber as explained with reference to any of FIGS. 1 through 11) onto the exterior of an electrical conductor 14B. Although the structure shown at 110 in FIG. 12 is directed to an electrical cable or wire, it should be understood that the electrical conductor 14B may be substituted by an optical fiber enclosed in a tube (see 14A in FIG. 9A) in other examples. The lamination 12A may be rolled prior to set up or cure of the impregnating material in the lamination 12A while the lamination is thus still flexible.

Figure 13:
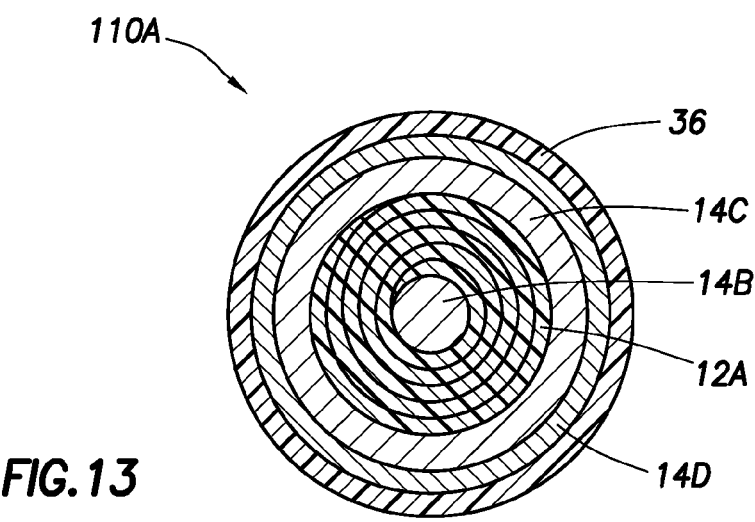

Another example of a cable is shown at 110A in FIG. 13, wherein a centrally disposed electrical conductor 14B (and/or optical fiber) is disposed inside a rolled lamination 12A as in FIG. 12. The lamination 12A may be covered on its exterior by a second electrical conductor 14C. The second electrical conductor 14C may be, for example, wire braid such as copper wire braid. Such braid is known in the art to be used, for example, in coaxial cable identified by industry designation RG8-U or RG 59-U. The second electrical conductor 14C may also be a metal foil layer or a metal tube. The second electrical conductor 14C may be covered on its exterior by a jacket 36, such as made from polyurethane or other plastic, or a fiber layer 14C such as braided carbon fiber, may be disposed between the jacket 36 and the second electrical conductor 14C.

Figure 14:
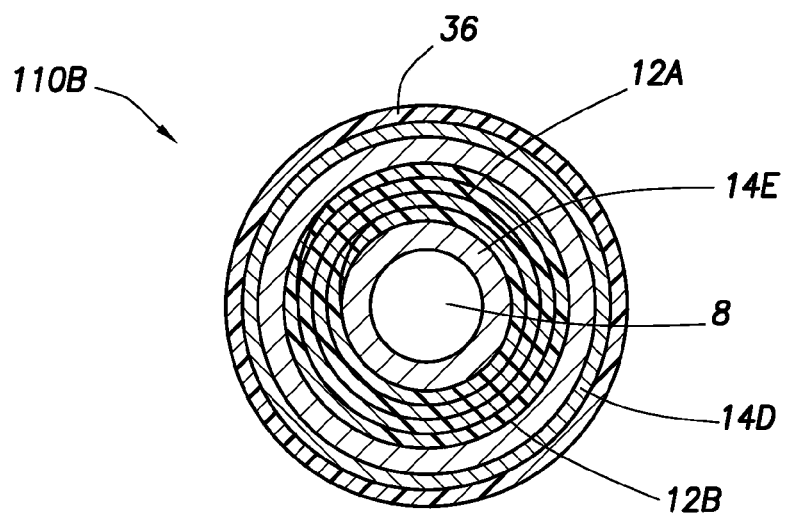

Another example of composite cable structure is shown in FIG. 14 at 110B. The cable in FIG. 14 is similar in overall configuration to the cable shown in FIG. 13, with the difference being that the centrally disposed electrical conductor 14E may define an interior passage 8. An optical fiber (see FIG. 9A) or other device may be disposed in the passage 8 in some examples.

Figure 15:
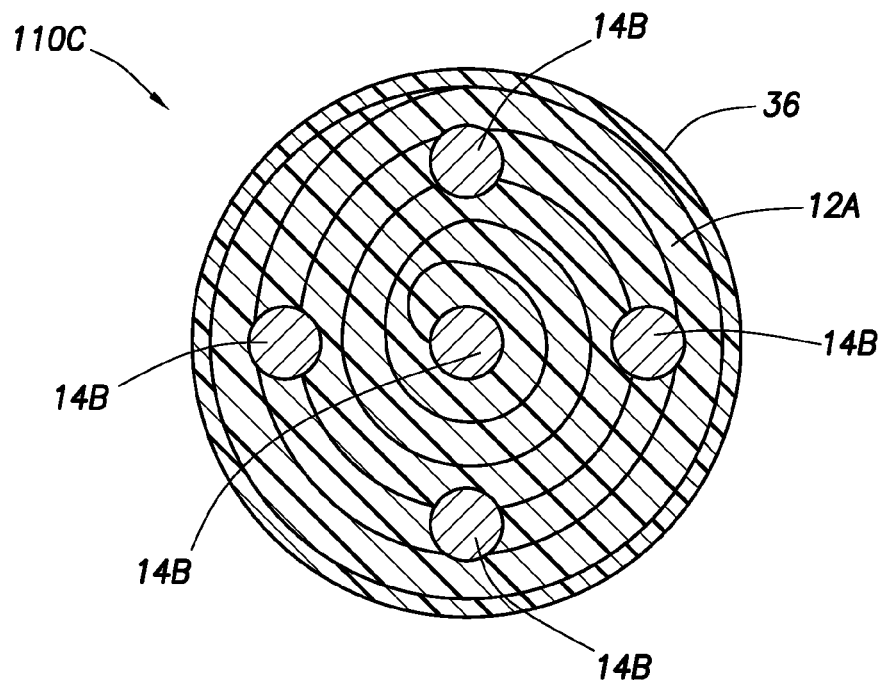

Another example composite cable structure is shown at 110C in FIG. 15. The cable in FIG. 15 includes a plurality of electrical conductors 14B embedded in a rolled, impregnated fiber lamination 12A. The cable 110C may in some examples be covered on its exterior by a jacket 36. As explained with reference to FIG. 3, the jacket 36 may be impermeable and serve to reduce fluid invasion into the lamination 12A by wicking along the fiber.

Figure 16:
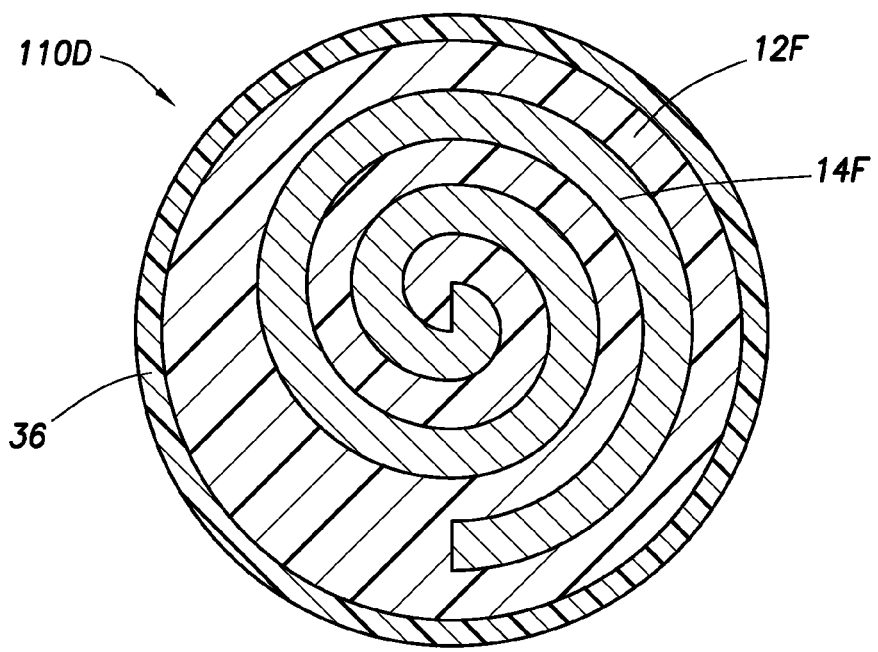
Figure 17:
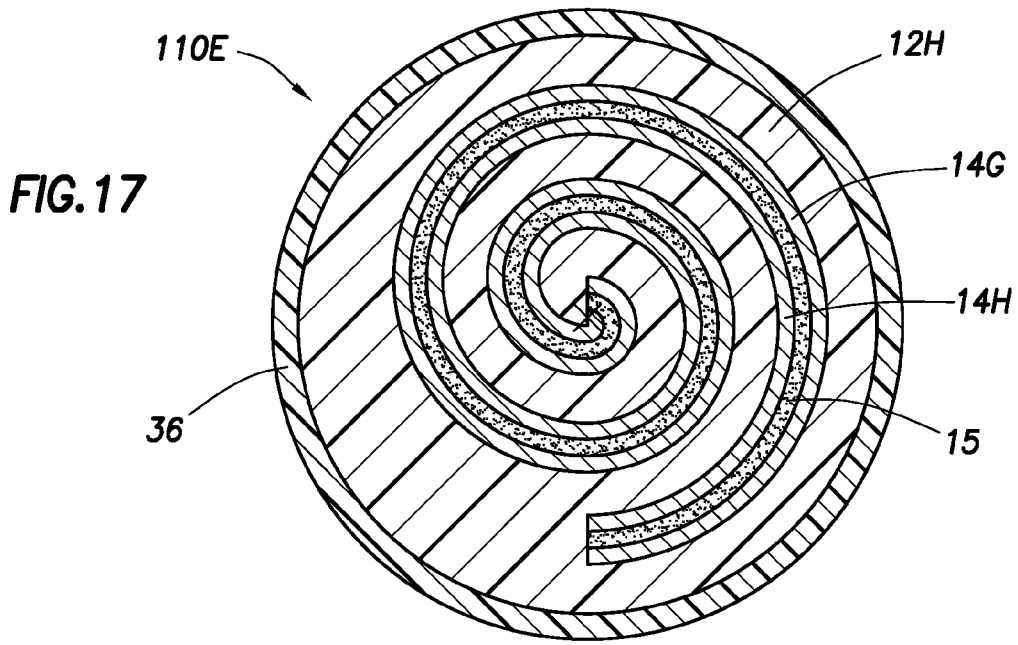

Another example of a cable is shown in FIG. 16 at 110D. The cable in the present example may be formed by rolling a fiber lamination 12F with a conductor layer 14F in contact therewith over a substantial portion of the surface area. The exterior of the cable 110D may be covered with an impermeable jacket 36. An alternative example of the foregoing cable shown in FIG. 17 at 110E may include a two-layer electrical conductor 14G, 14H separated by a dielectric layer 15 for form a waveguide or functional equivalent thereof. The composite conductor element (conductor layers 14G, 14H and dielectric layer 15) may be rolled with an impregnated fiber lamination 12H to form a substantially round cable. The rolled structure may be covered by an impermeable jacket 36 as in the previous examples.

Figure 18:
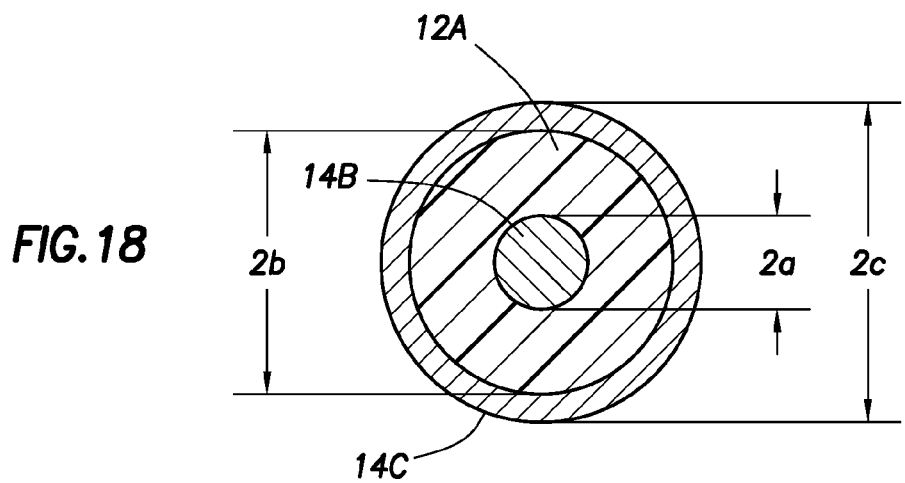
FIG. 18 shows calculation of impedance of a coaxial cable.
Figure 19:
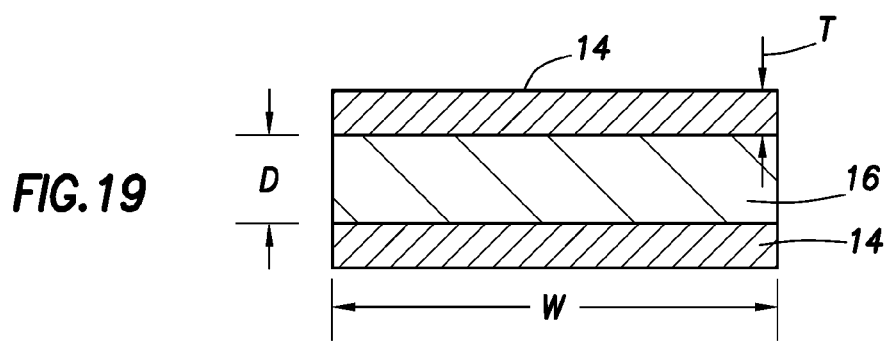
FIG. 19 shows calculation of impedance of a parallel layer waveguide.

Electrical impedance of various structures according to the invention may be calculated according to the following. Referring to FIG. 18, an example of a coaxial cable, for example, the structure shown in FIGS. 13 and 14, having an inner cylindrical conductor 14B and an outer annular cylindrical conductor 14C separated by a dielectric layer 12A has electrical impedance $Z_0$ determined by the following formula:

$$Z_0 = \frac{60}{\sqrt{\varepsilon'}} \ln \frac{b}{a}$$

wherein $\varepsilon'$ represents the dielectric constant of the dielectric layer 12A, and b and a represent, respectively, the diameters of the annular conductor 14C and the inner conductor 14B. Referring to FIG. 19, for a parallel layer waveguide, for example, the structure shown in FIGS. 2 and 3, including conductive layers 14 separated by a dielectric layer 16, the impedance is determined by the expression:

$$Z_0 = \frac{120\pi}{\sqrt{\varepsilon'}} \frac{D}{W}$$

wherein D represents the thickness of the dielectric layer 16 and W represents the width (lateral dimension) of the conductive layers 14.

Figure 20:
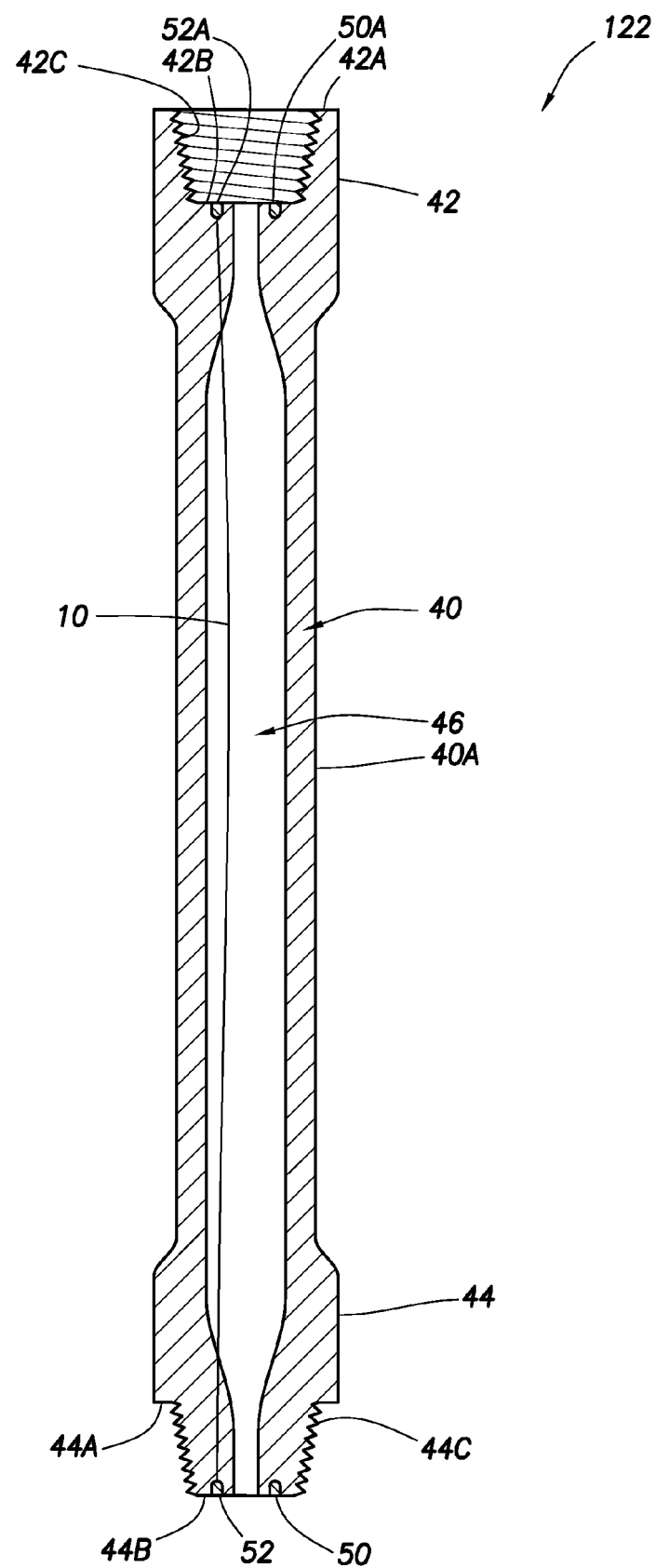
FIG. 20 shows an example of wired drill pipe using a cable made according to the invention.

Referring to FIG. 20, an example of a joint of wired drill pipe using a cable made according to the invention is shown in cross section. The pipe joint 122 includes a generally tubular shaped mandrel 40 having a central portion 40A of selected length, diameter and wall thickness. An interior passage 46 is provided so that drilling mud can pass freely through the pipe joint 122. A tool joint is disposed at each longitudinal end of the mandrel 40. The tool joints typically have greater wall thickness and outer diameter than the central portion 40A so that various stresses applied to the pipe string (20 in FIG. 1) may be transferred across the threaded connection between pipe joints without failure thereof. A tool joint 44 having a male threaded coupling therein is called a "pin" and is disposed at the lower end of the pipe joint 22 shown in FIG. 20. A tool joint 42 having a female threaded coupling therein called a "box" is shown at the other end of the pipe joint 122. The box of one pipe joint threadedly engages the pin end of the adjacent pipe joint to make the threaded connection.

The type of threaded connection used with typical examples of wired drill pipe, such as the one shown in FIG. 20 is called a "double shoulder" threaded connection. For example, the pin 44 includes an internal shoulder 44B on the "nose" thereof that mates with a corresponding internal shoulder 42B in the box 42 when tapered thread 44C on the pin 44 is engaged with (called "made up") corresponding tapered thread 42C on the box 42. An external shoulder 44A on the pin 44 mates with a corresponding shoulder 42A on the box 42 when the pin 44 and box 42 are made up.

Wired drill pipe, as described in the Madhavan et al. patent application publication mentioned above, can include cable 10 mounted on an interior surface of the pipe joint 122 and which extends from a groove 50 formed in the internal shoulder 44B of the pin 44 to a corresponding groove 50A formed in the internal shoulder 42A of the box 42. Typically, a passage or bore will be formed from an innermost portion of the grooves 50, 50A through the wall of the respective tool joints 44, 42 to the internal passage 46 inside the pipe joint 122. Example structures for such grooves and passages are also described in the Madhavan et al. patent application publication mentioned above. The cable 10, which can be made according to the description above includes one or more electrical conductors (not shown) and/or optical fibers (not shown) and can terminate in a communication coupling 52, 52A such as an electromagnetic coupling, disposed in each groove 50, 50A. The communication coupling 52, 52A can provide a signal and electrical power communication path between the electrical conductors (not shown) in adjacent pipe joints (not shown). The grooves 50, 50A are typically formed so as to traverse the entire circumference of the respective thread shoulders 44, 42.

The cable 10 can be affixed to the interior 46 of the pipe joint 122 by means such as adhesive bonding.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A wired pipe segment, comprising:
    a segment of pipe having a threaded connector at each longitudinal end;
    a cable extending between a groove formed in a thread shoulder in each threaded connector;
    a communication device disposed in each groove and in signal communication with at least one conductor in the cable;
    wherein the cable includes:
        at least one plastic impregnated fiber layer in contact with the at least one conductor; and
        a second plastic impregnated fiber layer in contact with the at least one conductor such that the at least one fiber layer and the second fiber layer enclose the at least one conductor.

2. The pipe segment of claim 1 wherein the at least one conductor comprises an electrically conductive layer.

3. The pipe segment of claim 2 wherein the electrically conductive layer comprises metal foil.

4. The pipe segment of claim 2 wherein the electrically conductive layer comprises a wire.

5. The pipe segment of claim 2 wherein the electrically conductive layer comprises metal particles embedded in plastic.

6. The pipe segment of claim 1 wherein the plastic comprises thermoplastic.

7. The pipe segment of claim 1 wherein the plastic comprises epoxy resin.

8. The pipe segment of claim 1 wherein the plastic comprises thermoset plastic.

9. The pipe segment of claim 1 wherein the fiber comprises glass.

10. The pipe segment of claim 1 wherein the fiber comprises carbon.

11. The pipe segment of claim 1 wherein the fiber comprises aramid.

12. The pipe segment of claim 1 wherein the at least one conductor comprises an optical fiber.

13. The pipe segment of claim 1 further comprising a second conductor proximate the at least one conductor and in contact with the at least one fiber layer.

14. The pipe segment of claim 13 further comprising a dielectric layer disposed between the first conductor and the second conductor, the dielectric layer having dielectric properties selected to provide the cable with a selected electrical impedance.

15. The pipe segment of claim 1 wherein the at least one fiber layer is rolled around the at least one conductor.

16. The pipe segment of claim 15 further comprising at least one additional conductor embedded in the roller fiber layer.

17. The pipe segment of claim 15 wherein the at least one conductor comprises a substantially flat layer, and the at least one conductor is rolled with the fiber layer.

18. The pipe segment of claim 15 wherein the at least one conductor comprises a pair of substantially flat electrically conductive layers separated by a dielectric layer, and the at least one conductor is rolled with the fiber layer.

19. The pipe segment of claim 15 further comprising at least a second electrical conductor disposed outside the rolled fiber layer.

20. The pipe segment of claim 1 further comprising a substantially impermeable jacket surrounding the fiber layer.

21. The pipe segment of claim 20 wherein the jacket comprises at least one of plastic and metal.

22. The pipe segment of claim 1 further comprising at least a second conductor disposed proximate the at least one conductor along a width dimension of the fiber layer.

23. The pipe segment of claim 22 further comprising at least a third conductor disposed proximate at least one of the at least one and the at least a second conductor along a thickness direction of the fiber layer.

24. The pipe segment of claim 1 further comprising spacers laterally adjacent the at least one conductor and configured such that the cable has a substantially rectangular cross-section.

* * * * *